United States Patent [19]
deMey, II

[11] Patent Number: 4,883,356
[45] Date of Patent: Nov. 28, 1989

[54] SPECTROMETER DETECTOR MOUNTING ASSEMBLY

[75] Inventor: Charles F. deMey, II, West Redding, Conn.

[73] Assignee: The Perkin-Elmer Corporation, Norwalk, Conn.

[21] Appl. No.: 243,853

[22] Filed: Sep. 13, 1988

[51] Int. Cl.4 .................................................. G01J 3/02
[52] U.S. Cl. .................................... 356/326; 356/346
[58] Field of Search ............... 356/300, 326, 328, 346; 248/487, 278

[56] References Cited

U.S. PATENT DOCUMENTS 4,573,794  3/1986  Covey et al. ..................... 356/346
4,810,091  3/1989  Sullivan ............................ 356/326

Primary Examiner—F. L. Evans
Attorney, Agent, or Firm—Thomas P. Murphy; Ronald G. Cummings; Edwin T. Grimes

[57] ABSTRACT

A three-axis adjustment detector mounting assembly in a spectrometer comprising first and second interconnected support plates with a pivot ball assembly interconnecting the first plate to the spectrometer for pivotal positioning of the first plate about first and second axes and a plurality of pivot ball assemblies interconnecting the first and second plate for pivotal positioning of the second plate about a third axis with a detector element mounted to the second plate such that a first adjustment screw mounted to the first plate moves the detector along a horizontal x-axis, a second adjustment screw mounted to the first plate moves the detector orthogonally along a z-axis, and a third adjustment screw mounted to the second plate moves the detector vertically along a y-axis for three-axis detector alignment.

14 Claims, 1 Drawing Sheet

SPECTROMETER DETECTOR MOUNTING ASSEMBLY

BACKGROUND AND SUMMARY OF THE INVENTION

This invention relates to a detector mounting assembly in a spectrometer and more particularly to a three-axis adjustment mounting assembly for precisely aligning a spectrometer detector relative to a radiation beam.

In analytical instruments such as spectrophotometers, it is necessary that the detector be precisely aligned with the radiation exiting from the sample chamber in order to generate an accurate signal. For example, in a typical Fourier transform infrared (FT-IR) spectrophotometer, infrared radiation from an infrared emitting source is collected, passed through an interferometer, passed through the sample to be analyzed, and finally brought to focus on an infrared detector. In systems utilizing adjustable optical elements, the mirrors are adjusted to align the radiation onto the detector. In systems where the optical elements are fixed, the detector must be aligned to the radiation beam. Fixed optical systems offer significant advantages such as economy of manufacture and ease of replacement of optical elements in the field. However, it is necessary that the detector be adjustable both vertically and horizontally for precise positioning in the optical beam and also adjustable along the optical beam for proper focus of the beam thereon.

Accordingly, it is an object of the present invention to provide a new and approved spectrometer detector mounting assembly which affords three-axis adjustment of the detector.

A further object of the invention is to provide such a detector mounting assembly which is highly precise in alignment adjustment.

Another object of the invention is to provide such a detector mounting assembly which affords convenient access for three-axis adjustment.

A further object of the invention is to provide such a detector mounting assembly which is economical to manufacture and which utilizes a minimum of components.

Other objects will be in part obvious and in part pointed out more in detail hereinafter.

Accordingly, it has been found that the foregoing objects and advantages are attained in a detector mounting assembly having first and second support plates. A multidirectional pivot ball assembly pivotally interconnects the first support plate to the base of the spectrophotometer so that the first support plate is selectively pivotal about first and second pivot axes. A first set screw adjustment assembly is positioned for selective pivotal positioning of the first support plate about the first pivot axis. A second set screw adjustment assembly is positioned for selective pivotal positioning of the first support plate about the second pivot axis. A plurality of pivot ball assemblies pivotally interconnect the first support plate and the second support plate so that the second support plate is selectively pivotal about a third pivot axis. A third set screw adjustment assembly is positioned for selective pivotal positioning of the second support plate about the third pivot axis. The detector is mounted to the second support plate within the optical beam and the first, second and third pivot axes are relatively positioned and disposed so that the first set screw assembly moves the detector along a first arc generally transverse to the radiation beam for horizontal detector adjustment, the third set screw adjustment assembly moves the detector along a third arc generally transverse to the radiation beam and orthogonal to the first arc for vertical detector adjustment, and the second set screw adjustment moves the detector along a second arc generally along the radiation beam for focus.

DESCRIPTION OF THE PREFERRED EMBODIMENT

Figure 1:
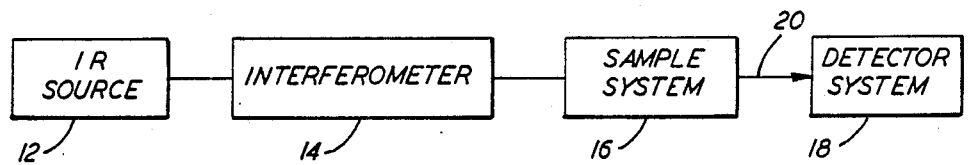
FIG. 1 is a block diagram of an exemplary spectrometer assembly incorporating the detector mounting assembly of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to the drawings, an exemplary spectrometer assembly in the form of an FT-IR spectrometer is shown comprising an infrared radiation source 12, an interferometer 14, a sample system 16 and a detector system 18. Fixed optical elements (not shown) direct the radiation beam 20 from the sample system 16 to the detector system 18. The detector system 18 includes a detector 22 mounted to the adjustable detector mounting assembly 10 of the present invention.

Figure 2:
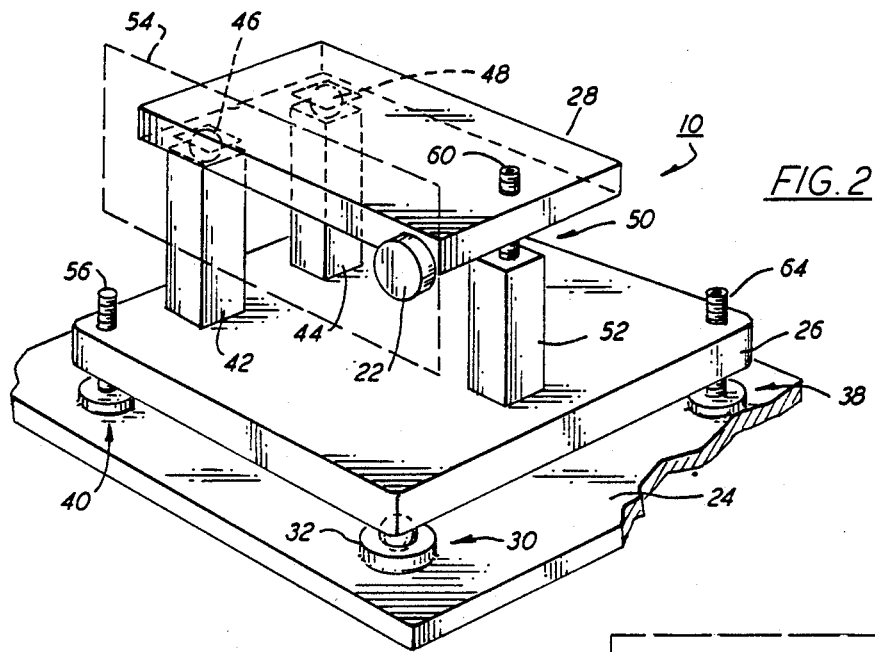
FIG. 2 is a diagrammatical perspective view of the detector mounting assembly of the present invention.
Figure 4:
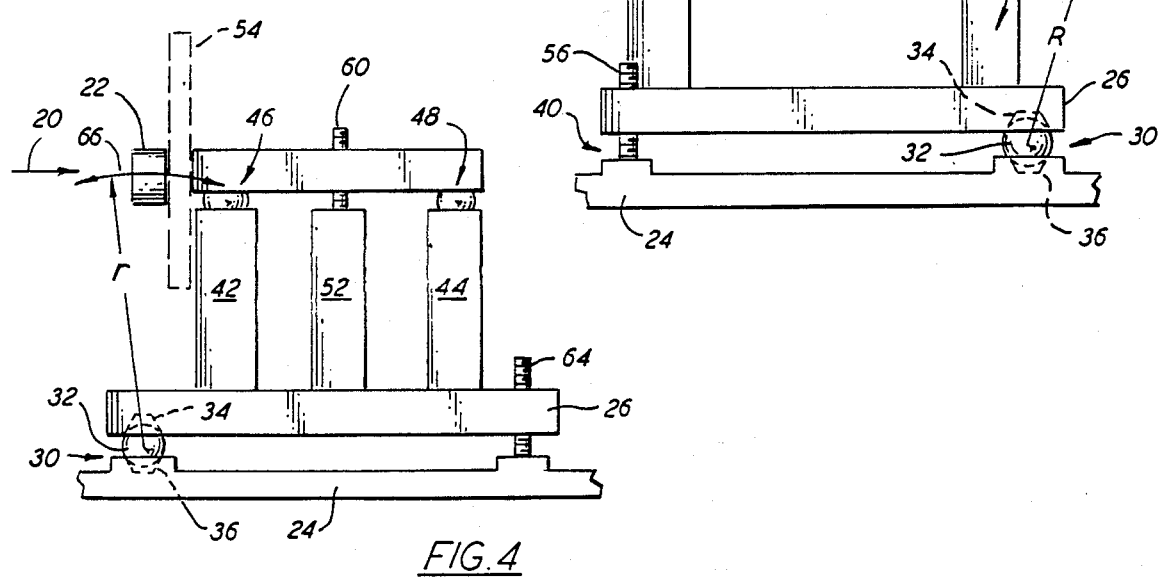
FIG. 4 is an end view of the mounting assembly of FIG. 2.

Referring to FIG. 2, the detector mounting assembly 10 is shown mounted to the base support plate 24 of the spectrometer housing. The mounting assembly 10 generally comprises a lower plate or support bracket 26 and an upper plate or support bracktt 28. The lower plate 26 is pivotally mounted to the base support 24 by a pivot ball assembly 30. Spring loaded hold down connectors (not shown) resiliently interconnect the lower plate 26 to the base support 24. The pivot ball assembly 30 has a pivot ball 32 received within a conical or tetrahedral depression or recess 34 in the lower plate 26 and a similar depression or recess 36 in the base support 24 (FIG. 4). Such a pivot ball assembly permits omni-directional pivotal movement without backlash or nonpivotal movement.

Opposing set screw adjustment assemblies 38, 40 interconnect the lower plate 26 and the base support 24 for selectively pivotally positioning the lower plate 26. The set screw adjustment assemblies are of conventional design and need not be described in detail. The set screw adjustment assembly 38 and the pivot ball 32 define a first pivot axis such that the set screw adjustment assembly 40 operates to selectively pivotally position the lower plate 26 about this first pivot axis. Similarly, the set screw adjustment assembly 40 and the pivot ball 32 define a second pivot axis such that the set screw adjustment assembly 38 operates to selectively pivotally position the lower plate 26 about this second pivot axis as described in more detail hereinafter.

The lower plate 26 has a pair of upstanding posts 42, 44 for mounting pivot ball assemblies 46, 48 respectively for pivotally connecting the upper plate 28 to the lower plate 26. The pivot ball assemblies are identical to pivot ball assembly 30 and are aligned to define a third pivot access.

A set screw adjustment assembly 50 interconnects the upper plate 28 to an upstanding post 52 extending from the lower plate 26 parallel to posts 42, 44. The set screw adjustment assembly 50 operates for selectively pivotally positioning the upper plate 28 about the third pivot access defined by the pivot ball assemblies 46, 48. Spring loaded hold down connectors (not shown) bias the upper plate 28 toward the support posts. Preferably, the lower plate 26 with posts 42, 44, 52 is a unitary die cast component for economy of construction.

Figure 3:
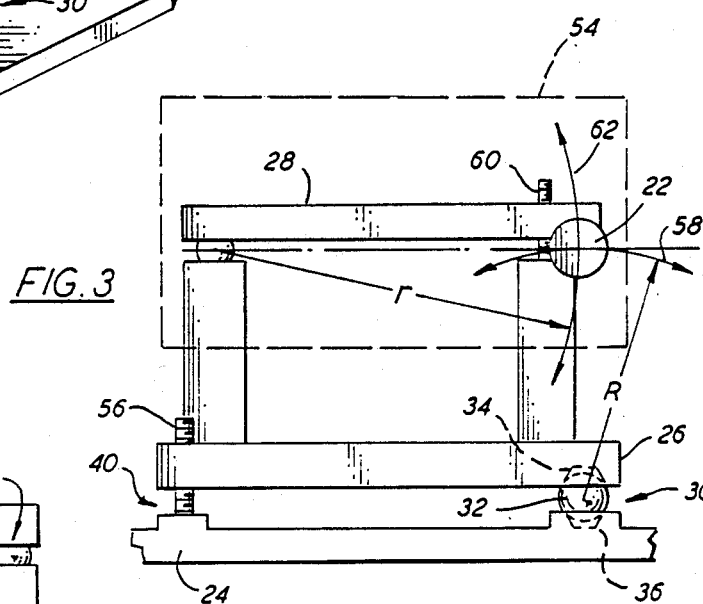
FIG. 3 is a front view of the mounting assembly of FIG. 2.

The detector element 22 is mounted to a printed circuit board 54 shown in phantom line. The printed circuit board 54 is mounted directly to the upper plate 28 so that the sensitive area of the detector 22 is approximately vertically directly above the center of the pivot ball 32 and generally horizontally in line with the center of the pivot balls of pivot assemblies 46, 48. (FIGS. 3 & 4). As seen in FIG. 4, the detector element 22 and the pivot ball 32 lie in a plane generally orthogonal to the radiation beam 20. The detector element 22 is also positioned in the optical path of radiation beam 20.

The first pivot axis formed by pivot ball 32 and set screw assembly 38 is orthogonal to the second pivot axis formed by pivot ball 32 and set screw assembly 40. The third pivot axis formed by pivot ball assemblies 46, 48 is generally parallel to the first pivot axis in spaced disposition to the lower plate 26.

Referring to FIG. 3, manual rotation of the set screw 56 of the set screw assembly 40 pivotally moves the lower plate 26 about the first pivot axis. Consequently, the connected upper plate 28 and the detector element 22 are also pivotally moved thereby with the detector 22 being pivoted along an arc indicated by the arrow 58. The arc 58 is generally orthogonal and transverse to the radiation beam 22 which is into the plane of the drawing as viewed in FIG. 3. Similarly, rotation of the set screw 60 of the adjustment assembly 50 pivots the upper plate 28 about the third pivot axis such that the detector 22 is moved in an arc indicated by the arrow 62. The arc 62 is orthogonal and transverse to the radiation beam 20 and is also orthogonal to the arc 58.

Thus, the set screw assembly 40 selectively positions the detector element 22 horizontally, i.e., along an x-axis as viewed in FIG. 3, while the set screw adjustment assembly 50 selectively positions the detector element 22 vertically, i.e, along a y-axis as viewed in FIG. 3.

Referring to FIG. 4, manual rotation of the set screw 64 pivots the lower plate 26 about the second pivot axis and thereby moves the detector element 22 in an arc depicted by the arrow 66. The arc 66 is generally along the path of travel of radiation beam 20 in the vicinity of detector element 22 so as to align the detector element 22 along the beam 20 at the point of focus of the radiation beam. The arc 66 is approximately orthogonal to the arcs 58, 62, i.e., a z-axis adjustment.

The radius r of the arcs 58, 62, 66 is preferably large compared to the adjustment dimension range of the detector 22 relative to the radiation beam 20. In the illustrated embodiment of a infrared detector mounting assembly for a FT-IR, the adjustment dimension is approximately 1/16 inch so that an acceptable arc radius is approximately 3 inches. In this instance, the angular adjustment of the detector is approximately 1.146° which exhibits a negligible linearity deviation of 0.0006 inches.

In operation, since the optical system is fixed, the detector 22 must be adjusted to precisely align the detector with the radiation beam 20. All three alignment adjustments may be made from the top of the mounting assembly 10 as set screws 56, 60, 64 are accessible from the top. Accordingly, set screw 56 provides precise horizontal alignment while set screw 60 provides precise vertical alignment. The respective pivot ball assemblies 30 and 46, 48 allow precise pivotal movement without backlash or nonpivotal movement to afford exact positioning of the detector element 22. Similarly, set screw 64 provides precise movement of the detector element 22 along the path of radiation beam 20 to position the detector element at the point of focus of the radiation beam. Accordingly, precise three-axis adjustment is attained.

As can be appreciated, a detector mounting assembly is provided which is economical to manufacture consisting of a minimum of relatively inexpensive components. Furthermore, precise three-axis detector alignment is readily attained with convenient adjustment access from a single direction.

As will be apparent to persons skilled in the art, various modifications and adaptations of the structure above described will become readily apparent without departure from the spirit and scope of the invention, the scope of which is defined in the appended claims.

What is claimed is:

1. A spectrometer assembly comprising
   means for producing a radiation beam from a sample for analytical detection, said radiation beam extending along an optical path,
   a detector for detecting said radiation beam,
   a housing having a base support, and
   a detector mounting assembly for precisely aligning the detector relative to said radiation beam comprising
   a first support plate
   first pivotal connection means for pivotally connecting said first support plate to said base support so that said first support plate is selectively pivotal about first and second pivot axes,
   first position adjustment means for selectively pivotally positioning said first support plate about said first pivot axis,
   second position adjustment means for selectively pivotally positioning said first support plate about said second pivot axis,
   a second support plate mounted to said first support plate,
   second pivotal connection means for pivotally connecting said second support plate to said first support plate so that said second support plate is selectively pivotal about a third pivot axis, and
   third position adjustment means for selectively pivotally positioning said second support plate about said third pivot axis,
   said detector being mounted to said second support plate and positioned within said optical path, and
   said first, second and third pivot axes being relatively positioned so that
   (a) said first adjustment means pivots said detector along a first arc generally transverse to said radiation beam,
   (b) said third adjustment means pivots said detector along a third arc generally transverse to said radiation beam and orthogonal to said first arc, and (c) said second adjustment means pivots said detector along a second arc generally along said radiation beam.

2. The device of claim 1 wherein said second pivot axis and said detector lie in a first plane approximately orthogonal to said radiation beam.

3. The device of claim 2 wherein said detector is positioned approximately directly above said first pivotal connection means.

4. The device of claim 3 wherein said third pivot axis is approximately orthogonal to said first plane.

5. The device of claim 2 wherein said first pivot axis and said detector lie in a second plane approximately orthogonal to said first plane.

6. The device of claim 1 wherein said housing has a top portion and said first, second and third position adjustment means are positioned so as to be manually adjustable from said top portion.

7. The device of claim 1 wherein said first pivotal connection means comprises a multidirectional pivot ball assembly interconnecting said first support plate and said base support.

8. The device of claim 7 wherein said second pivotal connection means comprises a plurality of pivot ball assemblies interconnecting said first support plate and said second support plate.

9. The device of claim 8 wherein a plurality of support posts extend from said first support plate, said plurality of pivot ball assemblies being mounted to said support posts to position said second support plate and said third pivot axis in spaced disposition above said first support plate.

10. The device of claim 7 wherein said first position adjustment means comprises a first set screw adjustment assembly and said second position adjustment means comprises a second set screw adjustment assembly.

11. The device of claim 10 wherein said first set screw adjustment assembly and said multidirectional pivot ball assembly define said second pivot axis and said second set screw adjustment assembly and said multidirectional pivot ball assembly define said first pivot axis.

12. The device of claim 11 wherein said second pivotal connection means comprises a plurality of pivot ball assemblies interconnecting said first support plate and said second support plate, said plurality of pivot ball assemblies defining said third pivot axis and said third position adjustment means comprises a third set screw adjustment assembly.

13. The device of claim 12 wherein said housing has a top portion and said first, second and third set screw adjustment assemblies each have a set screw manually adjustable from said top portion.

14. The device of claim 11 wherein said first and second pivot axis are orthogonal and said third pivot axis is parallel to said first pivot axis.

* * * * *